US010228924B2

(12) United States Patent
Berger et al.

(10) Patent No.: US 10,228,924 B2
(45) Date of Patent: Mar. 12, 2019

(54) APPLICATION DEPLOYMENT AND MONITORING IN A CLOUD ENVIRONMENT TO SATISFY INTEGRITY AND GEO-FENCING CONSTRAINTS

(71) Applicant: International Business Machines Corporation, Armonk, NY (US)

(72) Inventors: Stefan Berger, Larchmont, NY (US); Kenneth A. Goldman, Norwalk, CT (US); Simon J. Kofkin-Hansen, Cary, NC (US); Hui Lei, Scarsdale, NY (US); Vijay K. Naik, Pleasantville, NY (US); Dimitrios Pendarakis, Westport, CT (US); Jayaram Kallapalayam Radhakrishnan, Mount Kisco, NY (US); David R. Safford, Clifton Park, NY (US); Shu Tao, Irvington, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 15/132,321

(22) Filed: Apr. 19, 2016

(65) Prior Publication Data
US 2017/0300309 A1 Oct. 19, 2017

(51) Int. Cl.
*G06F 9/445* (2018.01)
*G06F 8/60* (2018.01)
(Continued)

(52) U.S. Cl.
CPC ................. *G06F 8/60* (2013.01); *G06F 8/61* (2013.01); *G06F 9/45533* (2013.01);
(Continued)

(58) Field of Classification Search
CPC . G06F 8/60; G06F 8/61; G06F 9/4558; G06F 2009/45587; H04L 67/10; H04L 69/03
(Continued)

(56) References Cited

U.S. PATENT DOCUMENTS 7,693,983 B1 * 4/2010 Gupta ................. H04L 12/1471
709/221
8,176,336 B1 * 5/2012 Mao ........................ H04L 9/006
713/189
(Continued)

OTHER PUBLICATIONS

Jayaram et al. "Trustworthy Geographically Fenced Hybrid Clouds", Dec. 8-12, 2014, Proceedings of the 15th International Middleware Conference, pp. 37-48.*
(Continued)

*Primary Examiner* — Jue Louie
(74) *Attorney, Agent, or Firm* — Cantor Colburn LLP (57) ABSTRACT

Examples of techniques for deploying an application on a cloud environment satisfying integrity and geo-fencing constraints are disclosed herein. A computer implemented method may include: receiving a guest application for deployment on a cloud environment; receiving the integrity constraints on the integrity of each of the plurality of host where the application is to be deployed; receiving geo-fencing constraints identifying a geographic location where the guest application is to be deployed; determining for which of the plurality of hosts the integrity constraints and the geo-fencing constraints are satisfied; and deploying the guest application on at least one of the plurality of hosts that satisfy the integrity constraints and the geo-fencing constraints.

12 Claims, 9 Drawing Sheets

(51) Int. Cl.
*G06F 8/61* (2018.01)
*G06F 9/455* (2018.01)
*H04L 29/08* (2006.01)
*H04W 4/021* (2018.01)
*H04L 29/06* (2006.01)
*G06F 21/57* (2013.01)
*H04L 12/24* (2006.01)

(52) U.S. Cl.
CPC .......... *G06F 9/45558* (2013.01); *G06F 21/57* (2013.01); *H04L 63/107* (2013.01); *H04L 67/10* (2013.01); *H04L 67/34* (2013.01); *H04W 4/021* (2013.01); *G06F 2009/45587* (2013.01); *G06F 2221/2111* (2013.01); *H04L 41/00* (2013.01)

(58) Field of Classification Search
USPC .......................... 717/100–178; 709/200–253
See application file for complete search history.

(56) References Cited

U.S. PATENT DOCUMENTS

| | | | | |
|---|---|---|---|---|
| 8,732,699 | B1* | 5/2014 | Hyser | G06F 9/5077 |
| | | | | 718/1 |
| 9,262,144 | B1* | 2/2016 | Apte | G06F 8/60 |
| 2007/0169049 | A1* | 7/2007 | Gingell | G06F 8/61 |
| | | | | 717/151 |
| 2009/0049510 | A1* | 2/2009 | Zhang | G06F 21/53 |
| | | | | 726/1 |
| 2012/0089833 | A1* | 4/2012 | Jirka | G06F 21/33 |
| | | | | 713/168 |
| 2012/0102199 | A1* | 4/2012 | Hopmann | G06F 9/5044 |
| | | | | 709/226 |
| 2012/0159158 | A1* | 6/2012 | Hashimoto | H04L 63/0485 |
| | | | | 713/156 |
| 2012/0284628 | A1* | 11/2012 | Wong | H04L 67/306 |
| | | | | 715/736 |
| 2013/0191527 | A1* | 7/2013 | Ashok | G06F 9/5072 |
| | | | | 709/224 |
| 2014/0038706 | A1 | 2/2014 | Froy et al. | |
| 2014/0164486 | A1 | 6/2014 | Ravichandran et al. | |
| 2014/0164776 | A1 | 6/2014 | Hook et al. | |
| 2014/0173232 | A1 | 6/2014 | Reohr et al. | |
| 2014/0250215 | A1* | 9/2014 | Bowen | G06F 21/57 |
| | | | | 709/223 |
| 2014/0280961 | A1* | 9/2014 | Martinez | H04L 41/5054 |
| | | | | 709/226 |
| 2014/0280977 | A1 | 9/2014 | Martinez et al. | |
| 2015/0188944 | A1* | 7/2015 | Dyer | H04L 63/20 |
| | | | | 726/3 |
| 2015/0319160 | A1* | 11/2015 | Ferguson | H04L 9/0894 |
| | | | | 726/10 |
| 2016/0057073 | A1* | 2/2016 | Steinder | H04L 47/72 |
| | | | | 709/226 |
| 2016/0259660 | A1* | 9/2016 | Gaurav | G06F 9/45558 |
| 2017/0041347 | A1* | 2/2017 | Nagaratnam | H04L 63/20 |

OTHER PUBLICATIONS

Gopalan et al. "Policy driven Remote Attestation", 2012.*
A. Van der Merwe, "Cloud Computing in a South African Bank," Gordon Institute of Business Science, University of Pretoria, Nov. 11, 2013, p. 1-78.
S. Bleikertz, "Automated Security Analysis of Infrastructure Clouds," Norwegian University of Science and Technology, Jun. 2010, p. 1-129.
S. Sengupta, et al.,"Cloud Computing Security—Trends and Research Directions," IEEE World congress on Services, 2011, p. 1-8.
S. Yan, et al.,"Infrastructure Management of Hybrid Cloud for Enterprise Users," IEEE, 2011, p. 1-6.
Berger et al. "vTPM: Virtualizing the Trusted Platform Module," Security 2006: 15th USENIX Security Symposium, pp. 305-320.
Greene, James. "Intel® Trusted Execution Technology: White Paper." Intel, Copyright 2010-2012, Intel Corporation, 8 pages, www.intel.com/content/www/us/en/architecture-and-technology/trusted-execution-technology/trusted-execution-technology-security-paper.html.
HyTrust Product Applicability Guide for Federal Risk and Authorization Management Program (FedRAMP)—HyTrust Addendum, VMware Compliance Reference Architecture Framework, Aug. 2014, 23 pages.
Paul "Take Control of Your PC with UEFI Secure Boot." Take Control of Your PC with UEFI Secure Boot | Linux Journal, Linux Journal, Nov. 30, 2015, 7 pages, www.linuxjournal.com/content/take-control-your-pc-uefi-secure-boot.
Sailer et al. "Design and Implementation of a TCG-based Integrity Measurement Architecture," Proceedings of the 13th USENIX Security Symposium, San Diego, CA, USA, Aug. 9-13, 2004, 17 pages.
Trusted Computing Group. Trusted Platform Module (TPM) Summary, Published: Apr. 1, 2008, http://www.trustedcomputinggroup.org, 3 pages.

* cited by examiner

APPLICATION DEPLOYMENT AND MONITORING IN A CLOUD ENVIRONMENT TO SATISFY INTEGRITY AND GEO-FENCING CONSTRAINTS

BACKGROUND

The present disclosure relates to cloud computing techniques and, more particularly, to techniques for application deployment and monitoring in a cloud environment to satisfy integrity and geo-fencing constraints.

Datacenter and cloud computing infrastructures are becoming increasingly popular due to their increased scale, agility, and elasticity arising from the ability to quickly provision and use precisely the requisite amount of compute resources on-demand (in the case of cloud computing infrastructures) to meet increased customer demands. However, mechanisms to verify whether a private datacenter or a public cloud or a combination (hybrid cloud) satisfies an organization's software security and geographic fencing policies are predominantly manual, time-consuming and do not scale.

Hybrid cloud computing environments (or "hybrid clouds"), which are compositions of private datacenters/clouds and public clouds are becoming increasingly popular. Trust in the public cloud provider's software stack and ensuring its compliance with the security policies of a private data center (i.e., organizational) is both essential and a key hurdle to increased adoption of hybrid clouds. Organizations cannot simply trust a public cloud provider's statements of compliance with software stack integrity and geo-fencing policies. Manual checking of the software stack on each computing system in the public cloud component of a hybrid cloud is both infeasible and does not scale.

SUMMARY

In accordance with aspects of the present disclosure, a computer-implemented method for deploying an application on a cloud environment satisfying integrity and geo-fencing constraints is provided. The computer implemented method may include: receiving a guest application for deployment on a cloud environment; receiving the integrity constraints on the integrity of each of the plurality of host where the application is to be deployed; receiving geo-fencing constraints identifying a geographic location where the guest application is to be deployed; determining for which of the plurality of hosts the integrity constraints and the geo-fencing constraints are satisfied; and deploying the guest application on at least one of the plurality of hosts that satisfy the integrity constraints and the geo-fencing constraints.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

DETAILED DESCRIPTION

Various implementations are described below by referring to several examples of techniques for application deployment and monitoring in a cloud environment to satisfy integrity and geo-fencing constraints. The techniques described herein automate the specification, deployment, and attestation of workload patterns in a hybrid cloud.

The present disclosure relates to increasing the trustworthiness of datacenter and cloud infrastructures (private, public and hybrid) executing software applications, especially critical enterprise applications, through scalable computer-implemented mechanisms to satisfy an organization's integrity and geo-fencing constraints on its applications when they are deployed to and executed on datacenter and cloud computing infrastructures. Geo-location and geographic fencing of computation in hybrid workloads is often needed for privacy sensitive workloads for legal reasons (data sovereignty, sales tax computations, data jurisdiction, etc.). Organizations cannot simply trust a public cloud provider's statements of compliance with software stack integrity and geo-fencing policies.

The present techniques enable an application (standalone or distributed) to be deployed in a public, private, or hybrid datacenter/cloud environment in a trustworthy manner. Often, 'trustworthy' implies that the software stack on which the application executes and the application components are checked for integrity, i.e., checked whether they have not been maliciously modified in the deployment process and that no malicious code (like malware, spyware) is introduced between the application developer and the infrastructure (public/private/hybrid) cloud that executes the application. The result is a trustworthy geographically fenced hybrid cloud (TGHC) or a trustworthy geographically fenced cloud (TGC)

One common method used for integrity checking is digital signatures of application components and its software stack. One method of digitally signing software is as follows: When a software component C1 is provided by a vendor V1, the vendor computes a checksum H1 of C1 using a cryptographic hash function (e.g., MD5, SHA, etc.) and then encrypts the checksum H1 using the V1's private key. The vendor V1 then distributes C1 along with the digital signature (i.e., the encrypted checksum). Often the digital signature is published on the vendor V1's webpage and is publicly accessible. A user of C1 can check the integrity of C1 and verify that the checksum does not contain any malware and/or that the checksum has not been maliciously modified in transit by recomputing the checksum of C1 and verifying it against the checksum H1 computed by V1 prior to distribution. A user of C1 can obtain H1 by decrypting the digital signature of C1 using V1's public key, obtained from a public key infrastructure (PKI).

In aspects of the present disclosure, using digital signatures and cryptographic hash functions for integrity verification enables integrity constraints to be specified at a high-level without explicitly specifying checksums. For example, if a user wants to run a map-reduce application, one way to specify an integrity constraint on the underlying map-reduce infrastructure (e.g., Apache Hadoop) is to explicitly compute the checksum (Hc) and specify that the Apache Hadoop executed by the cloud provider should have a checksum of Hc. Instead, with digital signatures, a user may simply specify that the user wants a certain Apache Hadoop version (e.g., version 2.7.2) to be executed in an integrity verified manner, and the present techniques automatically obtain the digital signature of the certain Apache Hadoop version a known and trusted software repositories or from Apache's website and perform integrity verification.

In addition, the present techniques also enable application developers to geographically fence an application to certain geographic locations. Such fencing may be at the level of a country, city or state, or be highly fine grained fencing at the level of a GPS coordinate or through a region (e.g., 10 km radius) around a GPS coordinate. Moreover, the present techniques enable such geographical fencing to be performed in a trustworthy manner and the geographic fencing to be independently attested.

The present techniques utilize the following as input:
The guest application with its constituent components, and integrity measurements or requirements of each of its components (as discussed herein);
A pattern or a topology associated with the deployed guest application (also called a workload pattern). A workload pattern may, for example, include of a set of virtual machines or containers connected by specific network links, and may have constraints on co-location of virtual machines/containers;
The set of software components (external to the guest application) used for the application to execute (referred to as the "software stack");
Constraints on the integrity of each component of the software stack;
Constraints on the geo-location of each deployment unit such as a virtual machine or container in the workload pattern.

More specifically, considering a distributed guest application deployed over virtual machines, the present techniques enable a developer to: specify a workload pattern of virtual machines; to delineate the virtual machines that have to be executed in a private cloud versus a public cloud; to specify and require the integrity of the software stack residing on each processing system in a public cloud that executes a virtual machine (i.e., an operating system, hypervisor session, installed security packages, etc.); to specify and require the integrity of the software stack residing on each of the virtual machines in the workload pattern; and, at the virtual machine level, to specify geographic constraints on where the virtual machine executes (i.e., by city, country, postal code, GPS coordinate, etc.).

This enables trusted, geographically fenced hybrid clouds (TGHCs) to satisfy the developer's specifications modularly, using hardware-assisted security.

In some implementations, the present disclosure provides a differentiated security approach for workloads within a cloud computing environment through automated specification and application of advanced security controls across a workload. For example, an organization may be enabled to verify that infrastructure as a service (IaaS) cloud providers conform to the organization's security policies. In some implementations, an organization is enabled to certify to its customers that customer workloads are being executed in a "trusted" environment that respects geographic constraints on the customer's data and computation. Additionally, in some implementations, an organization is enabled to achieve security policy confirmation, including with respect to geographic constraints, automatically while scaling to hundreds or thousands of processing systems in an IaaS cloud. These and other advantages will be apparent from the description that follows.

Figure 1A:
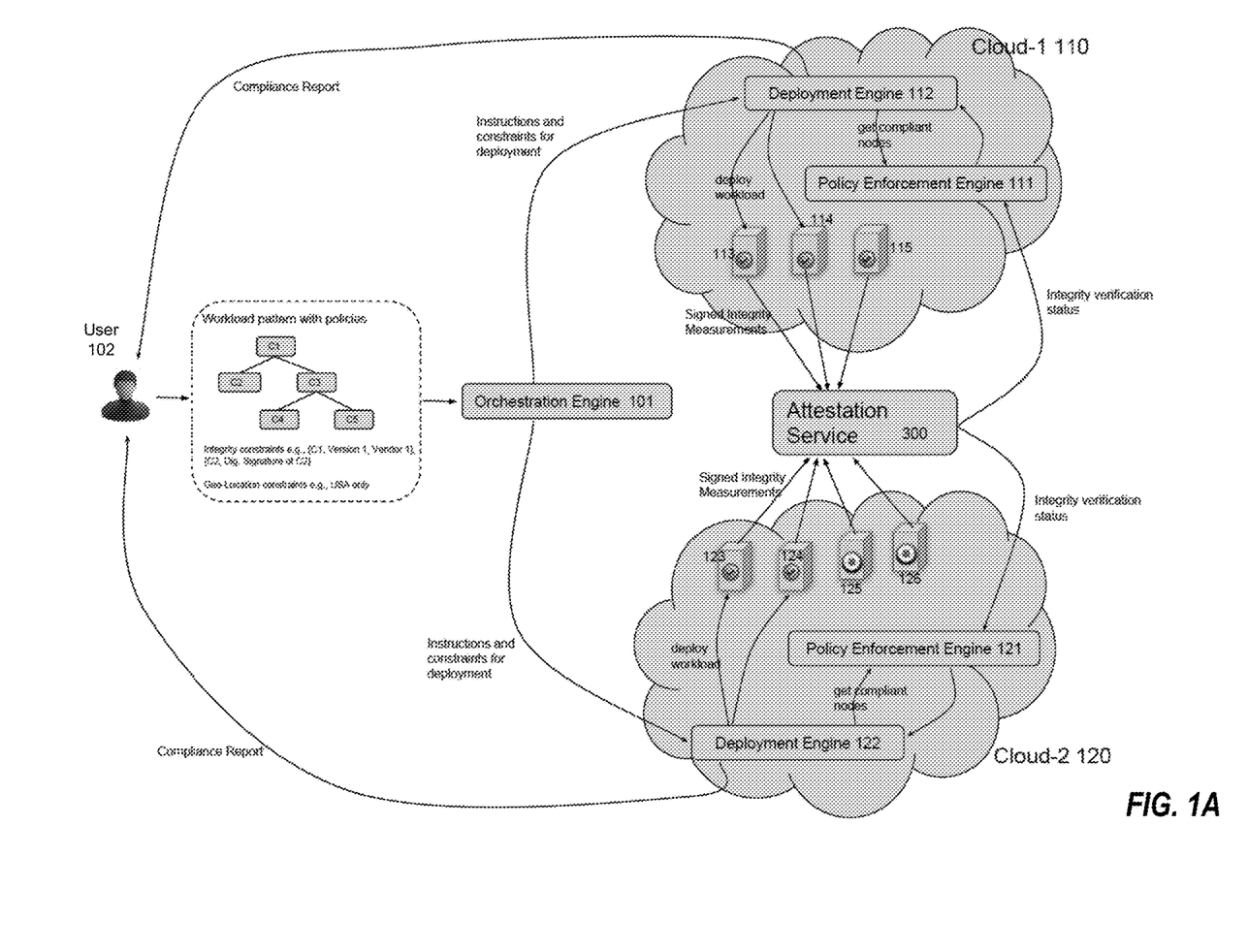
FIG. 1A illustrates a block diagram of an environment for deploying a workload pattern on a cloud environment to satisfy integrity and geo-fencing constraints according to the examples of the present disclosure.

FIG. 1A illustrates a block diagram of an environment for deploying a workload pattern on a cloud environment to satisfy integrity and geo-fencing constraints according to the examples of the present disclosure. The workload pattern, along with integrity and geo-fencing constraints (i.e. measurements and/or requirements), is provided as input to an orchestration engine 101. The orchestration engine 101 orchestrates the deployment and execution of a workload pattern across a plurality of cloud environments. In particular, FIG. 1A illustrates a scenario in which the orchestration engine 101 is responsible for deployment and execution across two cloud environments "Cloud-1" 110 and "Cloud-2" 120. These cloud environments may be any suitable combination of private and/or public cloud environments. FIG. 1A also includes an attestation service 300, policy enforcement engines (111 and 121) in each cloud 110, 120, and deployment engines 112, 122 in each cloud 110, 120.

In the example in FIG. 1A, each cloud environment includes processing systems 113, 114, 115 in Cloud 110 and processing systems 123, 124, 125, 126 in Cloud 120. The workload pattern is deployed on some of these processing systems depending on integrity and geographic constraints. Each processing system 113, 114, 115, 123, 124, 125, 126 includes a Trusted Platform Module (TPM), which is a hardware module that measures the integrity of the software stack executing on that processing system. Integrity measurements are anchored in a tamper-proof TPM in the present techniques. When a processing system (e.g., 113) is started (booted), the TPM measures the integrity of the software components on 113, including the operating system, hypervisor, device drivers, and other software. Integrity measurements are typically checksums computed using secure cryptographic hash functions. These integrity measurements are signed with the TPM's private key and sent to the attestation service 300 which decrypts them and verifies the integrity measurements against those obtained from digital signatures provided by or obtained from the respective vendors.

The attestation service 300 then sends the status of the integrity verification to the policy enforcement engine 112, 122 of the respective cloud 110, 120 for the respective processing system (e.g., 113). This status message specifies, for each processing system, whether the integrity of each individual software component on the processing system has been verified. The status message may be encrypted either using a key shared between the attestation service 300 and the policy enforcement engine 111, 121, or by using the private key of the attestation service 300 (provided the corresponding public key has been distributed to the policy enforcement engine). The present technique also uses the public key of each TPM in each cloud environment as securely distributed apriori to the attestation service 300.

Additionally, during the construction of the cloud environments 110, 120, and the installation of the processing systems 113, 114, 115, 116, 123, 124, 125, 126 in the cloud environments 110, 120, the geo-location of each processing system can be provisioned into each respective TPM module in the processing systems. Geo-location provisioned in this manner cannot be subsequently modified by application software executing on the processing system. Another technique for geo-location provisioning is to provision a GPS module in addition to the TPM module on each processing system, and securely connect the GPS module to the TPM module. When each processing system starts, the GPS module and the geo-location can then be read by the TPM module. The TPM module signs the geo-location with its private key and sends the signed geo-location to the attestation service 300, which in turn sends it to the respective policy enforcement engine 112, 122.

These techniques describe the creation of a trusted geographically-fenced cloud (TGC) using hardware-rooted trust, integrity verification, and geographic fencing. When the deployment occurs in a hybrid cloud environment, it is also referred to as a trusted geo-graphically fenced hybrid cloud (TGHC). Each TGC includes of a pool of trusted processing systems, integrity verified and geo-located using TPM modules, and managed by an orchestration engine, policy enforcement engine and a deployment engine, which work with an attestation service.

In an example, the orchestration engine 101 parses a workload pattern received as input, and determines the sets S1 and S2 of virtual machines in the workload pattern that are to be deployed to cloud 110 and cloud 120 respectively. The orchestration engine 101 then dispatches S1 and S2 with the corresponding integrity and geo-fencing constraints to the respective deployment engines 112, 122.

In cloud 110, the deployment engine 112 receives a pattern of virtual machines along with integrity and geo-fencing constraints. The deployment engine 112 then queries the policy enforcement engine 111 for processing systems that match the integrity and geo-fencing constraints. If such processing systems exist, the policy enforcement engine 111 sends the identities of such processing systems to the deployment engine 112. In the example of FIG. 1A, processing systems 113 and 114 in cloud 110 satisfy the constraints, and hence the workload pattern is deployed on processing systems 113 and 114. Similarly, in cloud 120, the workload pattern is deployed on processing systems 123 and 124. Processing systems 125 and 126 in cloud 120 are non-compliant processing systems, and processing system 115 in cloud 110 is an available compliant processing system that is not utilized to deploy the workload pattern, i.e., 113 and 114 are sufficient to deploy the workload pattern.

Once deployment is complete, the deployment engines 112, 122 send a compliance report to the user 102 as illustrated in FIG. 1A. This example does not preclude other embodiments where the deployment engine may send the compliance reports to the orchestration engine 101, which forwards the same to the user 102. The user 102 may also utilize login credentials to the attestation service 300 for further detailed compliance checking.

Figure 1B:
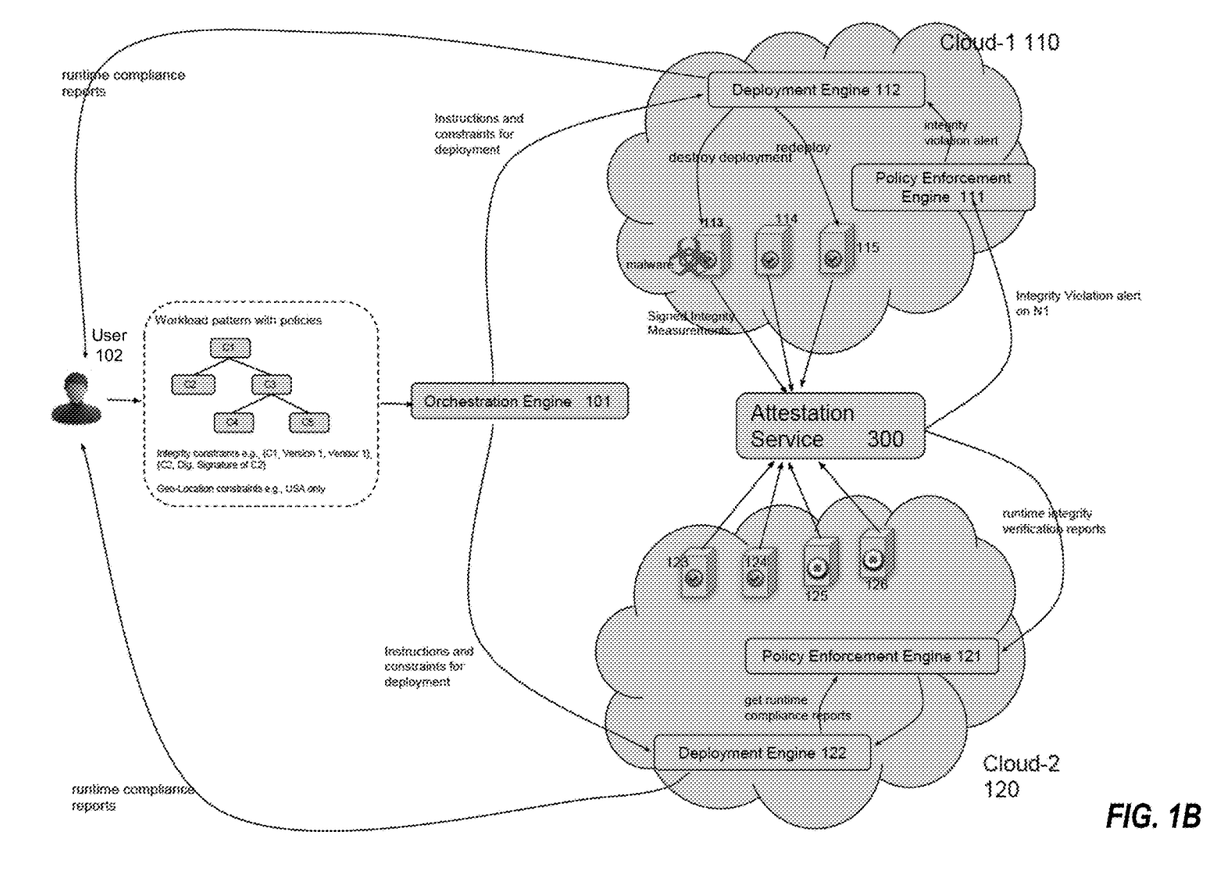
FIG. 1B illustrates a block diagram of an environment for continued monitoring of a deployed workload pattern on a cloud environment to satisfy integrity and geo-fencing constraints according to examples of the present disclosure.

The present techniques also perform continued monitoring of a deployed workload pattern at execution time to mitigate against integrity modifications arising from malware, spyware, and other attacks—this is illustrated in FIG. 1B. In the example of FIG. 1B, processing system 113 experiences a malware attack which maliciously modifies a plurality of components on the software stack executing the workload. This modification results in an integrity violation, which is detected either by the TPM module of processing system 113 or by an integrity measurement software component executing on processing system 113. This integrity violation is reported to the attestation service 300, which reports it to the policy enforcement engine 111. The policy enforcement engine 111 can be configured to take corrective action by itself, or report the violation to the deployment engine 112. In FIG. 1B, the integrity violation is reported to the deployment engine 112, which destroys the existing deployment on processing system 113, and redeploys the workload to processing system 115 which is compliant with the integrity and geo-fencing constraints of the workload. The deployment engine 112 sends a report of the integrity violation and a corrective action performed (redeployment to 115) to the user 101.

The corrective action that has to be taken (i.e., the redeployment to processing system 115) in response to an integrity violation is configurable by either the user 101 or an administrator of the cloud 110. The corrective action can range from destroying the application deployment on a single processing system, destroying the entire application deployment, and/or sending notifications to the user 101. The user 101 may also choose to customize the corrective action based on the severity of the integrity violation and the software component whose integrity is compromised. Corrective actions may also be taken if the geo-location of a processing system changes, e.g., due to theft of the processing system from the cloud.

Figure 2:
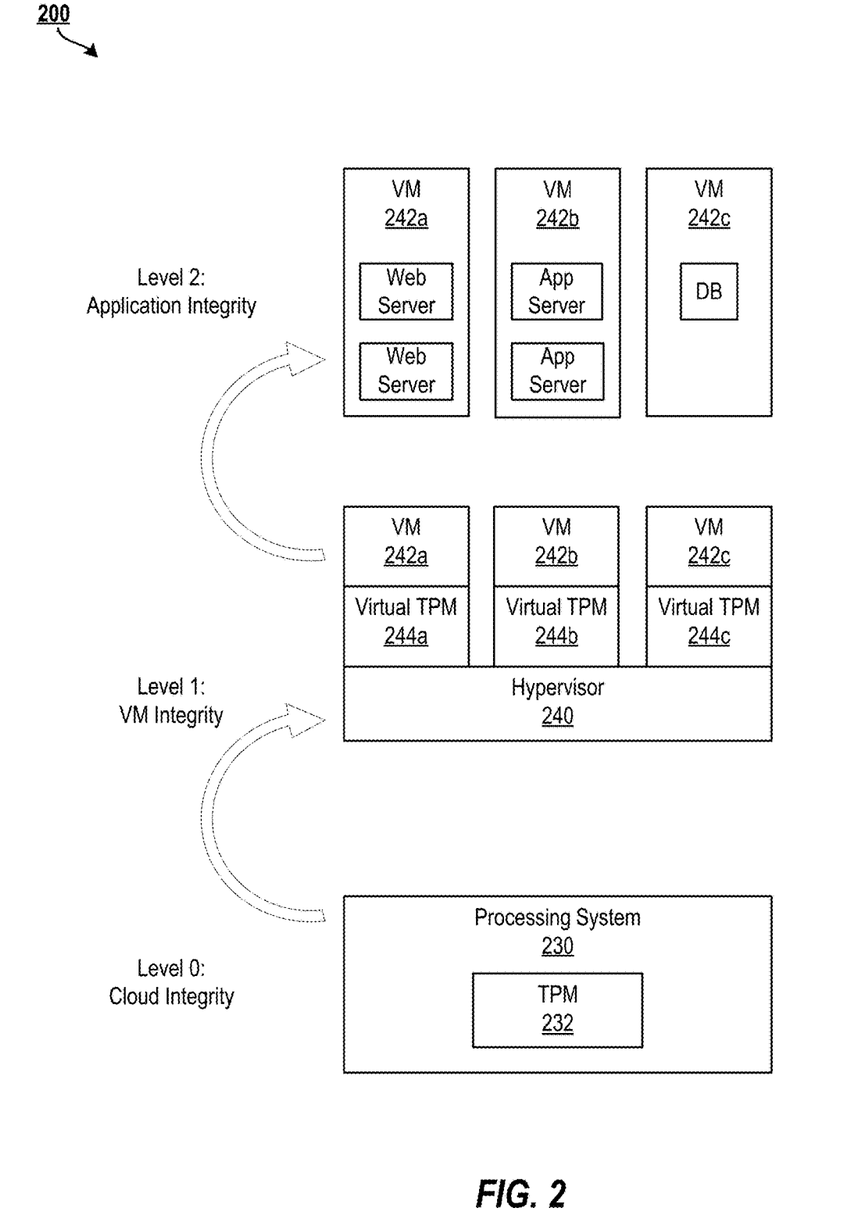
FIG. 2 illustrates a block diagram of an environment for monitoring a workload pattern on a hybrid cloud to determine whether a geographical constraint is satisfied according to examples of the present disclosure.

Now referring to FIG. 2, and as discussed herein, integrity measurement and verification of software components on a processing system 230 is accomplished by a piece of trusted code stored in firmware of a processing system and an associated TPM module 232. The TPM module 232 provides security functions including special registers (i.e., platform configuration registers (PCRs)), which contain various measurements in a shielded location in a manner that prevents spoofing. The processing systems' firmware launches a core root of trust (CRTM), which initiates a trust chain by measuring code and data in the firmware itself and the subsequent boot loader. The firmware extends each measurement into a platform configurations register in the attached TPM module 232. The root of trust then continues from the firmware, though the bootloader upward into and through the operating system, applications, and services layers. This procedure of measuring and logging is implemented to boot a trusted processing system. An operating system running on the trusted processing system may validate all software being executed and also extends measurements into the attached TPM module while maintaining a log. Software validation may include the verification of digital signatures on files and may lead to the operating system kernel refusing to load a file if either no signature, or a malformed signature, or a signature from an unknown key was found. The operating system kernel may log any suitable action.

The TPM module 232 attests (i.e., proves) the list of measurements to a third party by signing the current state of the PCRs with a private key known inside the TPM module 232. The private key's corresponding public key can be used by the third party (i.e., attestation processing system) to verify the signature and thereby the measurement of the firmware, boot loader, operating system kernel and initial RAM disk as well as all applications and libraries executed on the system. Processing system 130 may be considered trusted if each of the individual measurements, which can be read from provided logs, is considered trusted or none of them is found on a black list (i.e., untrusted). Similarly processing system 230 may be considered trusted if the logs do not show that any application was tried to be started that had a malformed signature.

A virtual TPM system may be used for TGHCs to provide TPM functionality to a virtual machine (e.g., VM 242a, 242b, 242c). This enables programs to interact with a virtual TPM (e.g., virtual TPM 244a, 244b, 244c) in a virtual system the same way the programs would interact with a TPM module on a physical processing system (e.g., TPM chip 232 on processing system 230). Each VM 242a, 242b, 242c receives its own unique, emulated, software virtual TPM (e.g., virtual TM 244a, 244b, 244c). Each of the virtual TPM's secrets (i.e., keys, NVRAM, etc.) may be managed by a virtual TPM manager domain, which seals the secrets to the physical TPM chip. If the process of creating each of these domains (i.e., manager, virtual TPM, and operating system) is trusted, the virtual TPM system extends the chain of trust rooted in the hardware TPM module 232 to VM 242a, 242b, 242c running in a hypervisor session.

The geographical location of processing system 230 (i.e., city, country, postal code, GPS coordinate, etc.) is securely written to TPM module 232. This can be done without any hardware changes. The TPM module 232 handles the secure storage of the geographical location. Through a secure provisioning process, the geographical location is provisioned into a nonvolatile index (e.g., NVRAM index) in TPM module 232 and the boot process extends the contents of the geographic location into a PCR in TPM module 232. An infrastructure as a service (IaaS) resource management system (e.g., OpenStack Nova) may be used to manage the pool of trusted processing systems, and to instantiate sensitive virtual machines on trusted processing systems after verifying from the attestation processing system that a processing system in the cloud is actually running a trusted software stack and also satisfies any of the geographical constraints specified for the virtual machine. Environment 200 enables verification of firmware (i.e., BIOS, UEFI, etc.) on processing system 230 at level 0: cloud integrity, verification of the operating system and hypervisor 240 components at level 1 (VM integrity), and verification of VM 242a, 242b, 242c and the software running on the virtual machines at level 2: application integrity.

Figure 3:
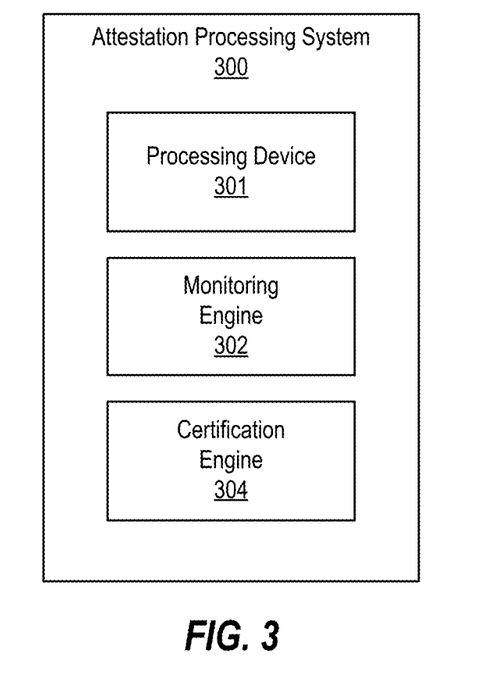
FIG. 3 illustrates a block diagram of an attestation processing system for monitoring a workload pattern on a hybrid cloud to determine whether a geographical constraint is satisfied according to examples of the present disclosure.

FIG. 3 illustrates a block diagram of an attestation processing service 300 for monitoring a pool of processing systems on a trusted geographically-fenced cloud environment (TGC) and a workload pattern executing on such environments to verify whether integrity and geo-fencing constraints are satisfied. The various components, modules, engines, etc. described regarding FIG. 3 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processing device 301 for executing those instructions. Thus a system memory can be said to store program instructions that when executed by processing device 301 implement the engines described herein. Other engines may also be utilized to include other features and functionality described in other examples herein.

As discussed herein, processing system 300 may include processing device 301, monitoring engine 302, and certification engine 304. Alternatively or additionally, processing system 300 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

The monitoring engine 302 receives signed integrity measurements (checksums) from the TPMs and virtual TPMs in pool of processing systems in a TGC environment as described herein. Such measurements are encrypted and signed by the private keys of the corresponding TPMs and virtual TPMs. The monitoring engine 302 decrypts the integrity measurements obtained from the TPMs and virtual TPMs, and verifies the integrity measurements by comparing the checksums against those obtained from the digital signatures provided by the software vendor. The results of this comparison are then certified by the certification engine 304 and sent to the policy enforcement engine. One method of certifying the results of integrity verification is by using digital signatures, i.e., signing the results with the attestation processing system's private key.

Figure 4:
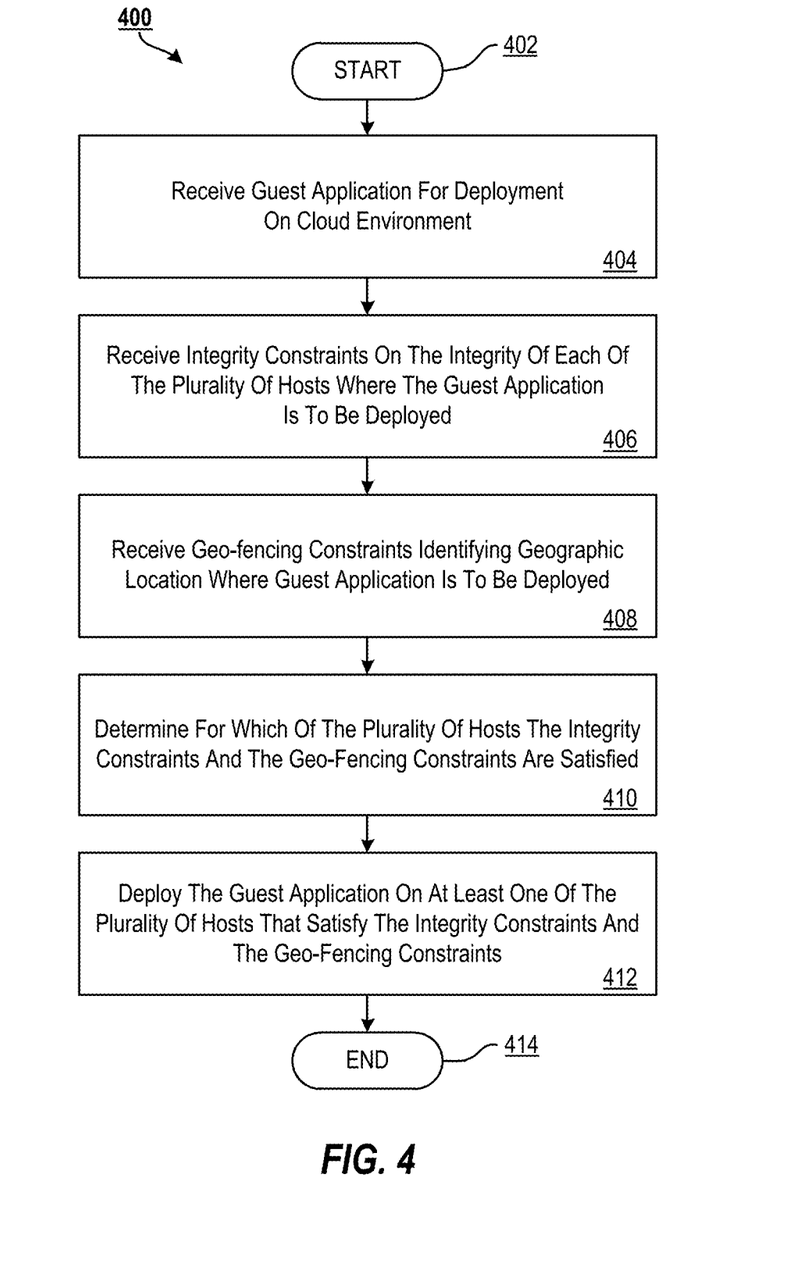
FIG. 4 illustrates a flow diagram of a method for monitoring a workload pattern on a hybrid cloud to determine whether a geographical constraint is satisfied according to examples of the present disclosure.

FIG. 4 illustrates a flow diagram of a method 400 for deploying an application on a cloud environment satisfying integrity and geo-fencing constraints according to examples of the present disclosure. In examples, the cloud environment may be a public cloud, a private cloud, or a hybrid cloud Method 400 starts at block 402 and continues to block 404.

At block 404, method 400 comprises receiving a guest application for deployment on a cloud environment. At block 406, method 400 comprises receiving the integrity constraints on the integrity of each of the plurality of host where the guest application is to be deployed. At block 408, method 400 comprises receiving geo-fencing constraints identifying a geographic location where the guest application is to be deployed. At block 410, method 400 comprises determining for which of the plurality of hosts the integrity constraints and the geo-fencing constraints are satisfied. At block 412, method 400 comprises deploying the guest application on at least one of the plurality of hosts that satisfy the integrity constraints and the geo-fencing constraints. Method 400 continues to block 414 and ends.

Additional processes also may be included. For example, method 400 may further comprise providing evidence of compliance with the integrity constraints and the geo-fencing constraints to an attestation service and policy enforcement service which attests the compliance of at least one of the plurality of hosts on which the guest application was deployed in the cloud environment. In examples, the guest application deployed on the cloud environment, the software stack, and the plurality of hosts are continuously monitored at runtime to ensure continued compliance with the integrity constraints and the geo-fencing constraints, and evidence of the compliance is provided to the attestation service and policy enforcement service. In another example, method 400 may comprise preventing initial deployment of the guest application when at least one of the integrity constraints and the geo-fencing constraints are not satisfied and sending a notification that the at least one of the integrity constraints and the geo-fencing constraints are not satisfied. Method 400 may also comprise specifying the guest application as a workload pattern of virtual machines or as a workload pattern of Linux containers and interconnections between them. In examples, the integrity constraints and the geo-fencing constraints may be combined with a plurality of deployment constraints on the deployment of the workload pattern in a hybrid cloud environment. It should be understood that the processes depicted in FIG. 4 represent illustrations, and that other processes may be added or existing processes may be removed, modified, or rearranged without departing from the scope and spirit of the present disclosure.

Figure 5:
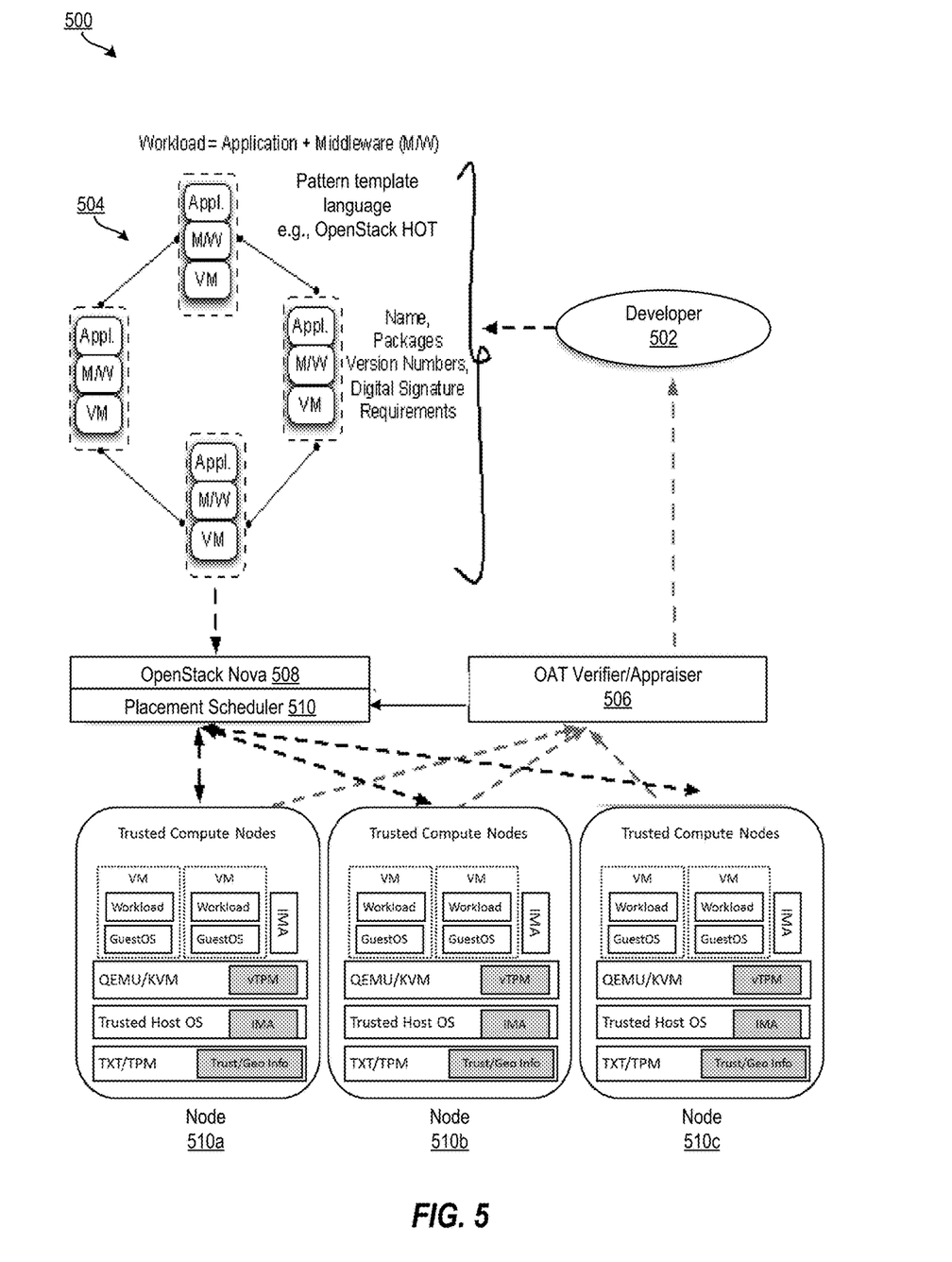
FIG. 5 illustrates a block diagram of an overall architecture of the present techniques according to examples of the present disclosure.

FIG. 5 illustrates a block diagram of an architecture of the present techniques according to examples of the present disclosure, in an OpenStack Infrastructure-as-a-Service (IaaS) cloud management platform. In the present example, a developer 502 specifies workload patterns 504 at a fine granularity, for example, using enhanced pattern templates in OpenStack HOT template language. Each node 510*a*, 510*b*, 510*c* in the trusted compute pool performs a "trusted boot" and authenticates itself to the OpenAttestattion (OAT) verifier/appraiser 506 which informs OpenStack Nova 508 of the verification. OpenStack Nova's Placement Scheduler 510 uses constraints found in the workload pattern to deploy guest virtual machines and software packages on hosts (e.g., nodes 510*a*, 510*b*, 510*c*) that fulfill those constraints. The integrity of the hosts where the software stack may be deployed is then checked against the constraints found in the workload pattern and the integrity status as reported by the OAT verifier/appraiser 506. It should be appreciated that the example of FIG. 5 uses OpenStack, the OpenAttestation (OAT) verifier/appraiser 506. However, other implementations are also possible, and other pattern template languages and their extensions may also be used. In the example of FIG. 5, Nova serves as the deployment engine and policy enforcement engine.

Figure 6:
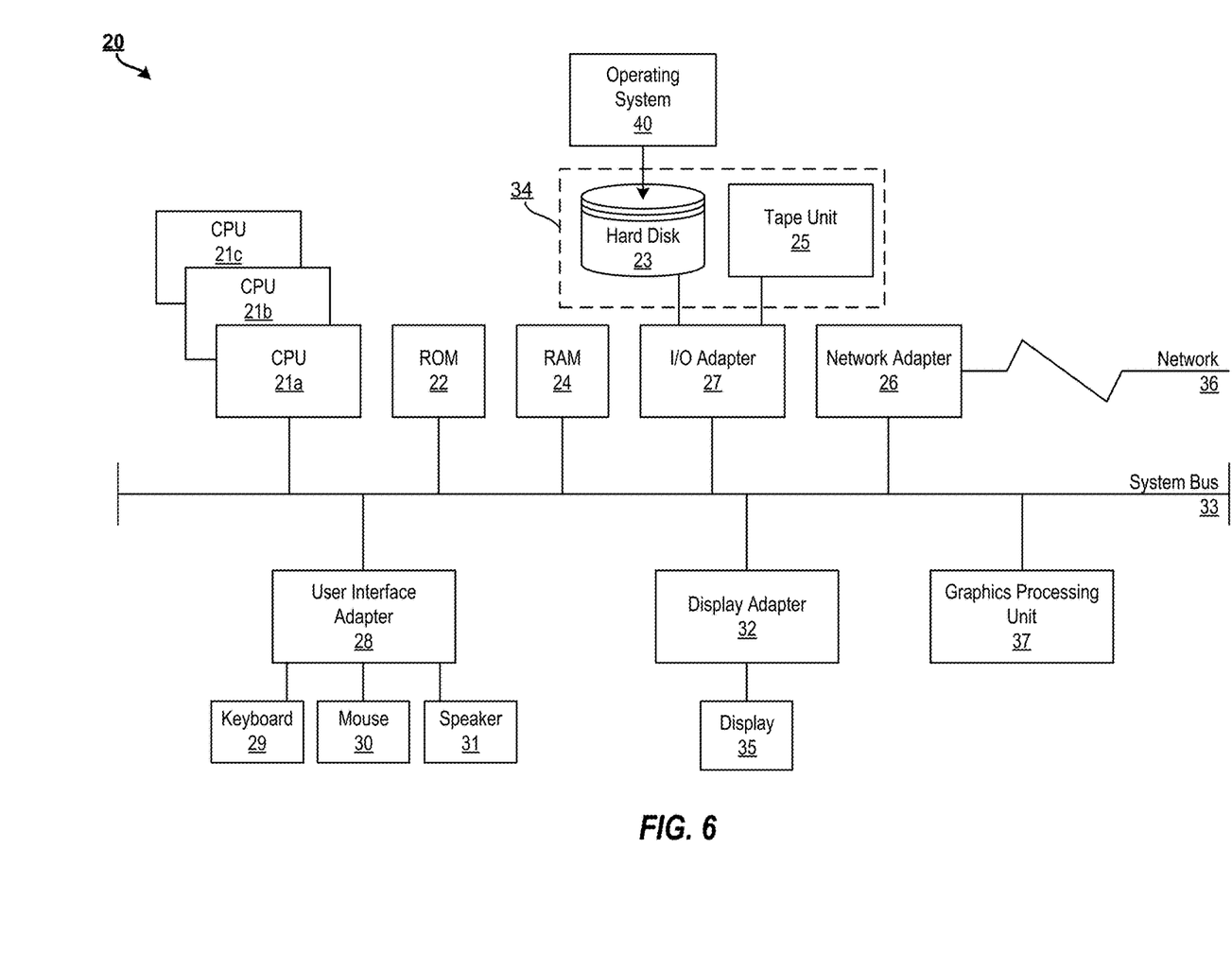
FIG. 6 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 6 illustrates a block diagram of a processing system 20 for implementing the techniques described herein. In examples, processing system 20 has one or more central processing units (processors) 21*a*, 21*b*, 21*c*, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
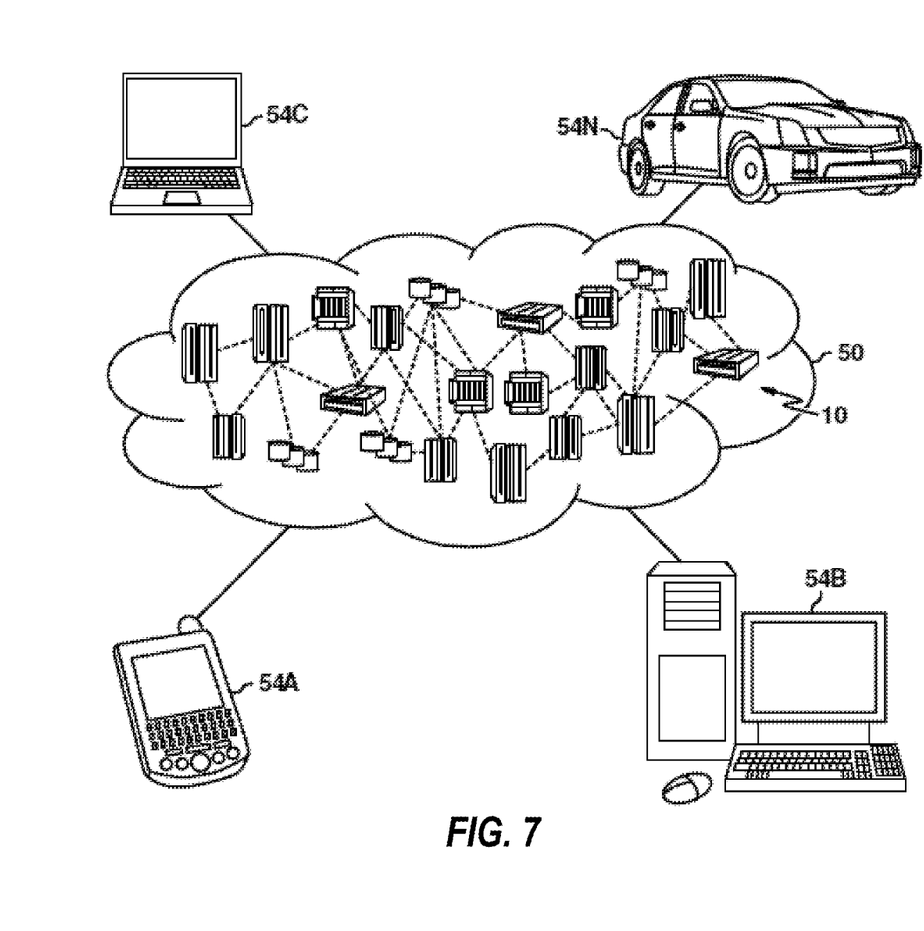
FIG. 7 illustrates a cloud computing environment according to examples of the present disclosure.

Referring now to FIG. 7, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
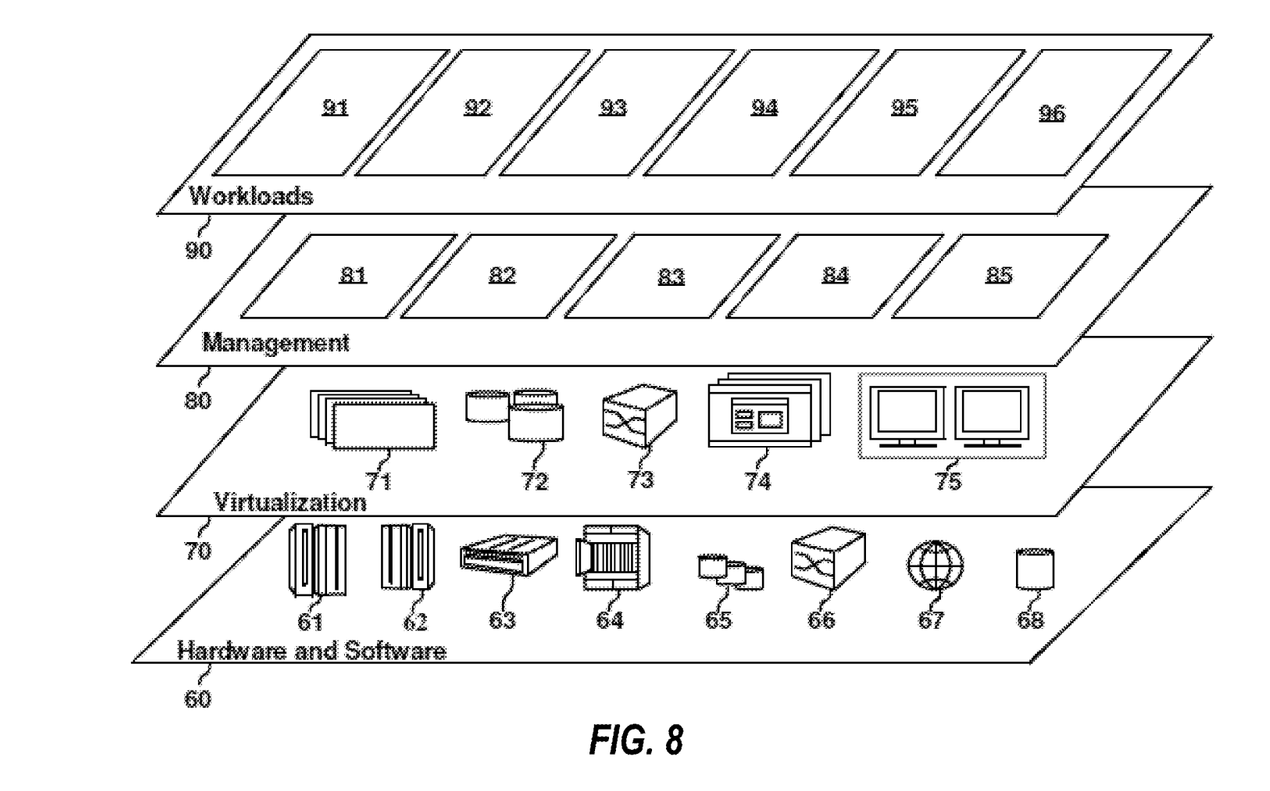
FIG. 8 illustrates abstraction model layers according to examples of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deploying a workload pattern on a hybrid cloud while satisfying a geographical constraint 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for deploying an application on a cloud environment satisfying integrity and geo-fencing constraints, the method comprising:
   receiving a guest application for deployment on a cloud environment;
   receiving the integrity constraints on the integrity of each of a plurality of hosts where the application is to be deployed;
   receiving geo-fencing constraints identifying a geographic location where the guest application is to be deployed;
   verifying integrity of at least one of the plurality of hosts based at least in part on the integrity constraints by receiving a checksum from a trusted platform module (TPM) and a virtual TPM for each of the plurality of hosts, decrypting the checksum, verifying the checksum by comparing the decrypted checksum against a checksum received from a digital signature associated with the guest application, and certifying results of the comparison of the decrypted checksum against a checksum received from the digital signature associated with the guest application by signing the results with a private key;
   determining for which of the plurality of hosts the integrity constraints and the geo-fencing constraints are satisfied;
   deploying the guest application on at least one of the plurality of hosts that satisfy the integrity constraints and the geo-fencing constraints, the guest application being specified as a workload pattern of virtual machines and interconnections between them;
   performing monitoring of a deployed workload pattern at execution time to mitigate against integrity modifications;
   detecting an integrity violation of the deployed workload pattern; and
   responsive to detecting the integrity violation, initiating a corrective action, the corrective action comprising destroying the deployed workload pattern on the at least one of the plurality of hosts to which the workload pattern was deployed and redeploying the workload pattern to another of the plurality of hosts that satisfy the integrity constraints and the geo-fencing constraints.

2. The computer implemented method of claim 1, further comprising:
   providing evidence of compliance with the integrity constraints and the geo-fencing constraints to an attestation service and policy enforcement service which attest the compliance of at least one of the plurality of hosts on which the guest application was deployed in the cloud environment.

3. The computer implemented method of claim 1, further comprising:
   preventing initial deployment of the guest application when at least one of the integrity constraints and the geo-fencing constraints are not satisfied; and
   sending a notification that the at least one of the integrity constraints and the geo-fencing constraints are not satisfied.

4. The computer implemented method of claim 1, further comprising:
   specifying the guest application as a workload pattern of Linux containers and interconnections between the Linux containers.

5. The computer implemented method of claim 1, wherein the integrity constraints and the geo-fencing constraints are combined with a plurality of deployment constraints on the deployment of the workload pattern in a hybrid cloud environment.

6. The computer-implemented method of claim 1, wherein the corrective action further comprises destroying the guest application deployment.

7. The computer-implemented method of claim 1, wherein the corrective action is initiated responsive to a change to a geo-location of the at least one of the plurality of hosts.

8. A system for deploying an application on a cloud environment satisfying integrity and geo-fencing constraints, the system comprising:
   a processor in communication with one or more types of memory, the processor configured to:
     receive a guest application for deployment on a cloud environment;
     receive the integrity constraints on the integrity of each of the plurality of host where the application is to be deployed;
     receive geo-fencing constraints identifying a geographic location where the guest application is to be deployed;
     verify integrity of at least one of the plurality of hosts based at least in part on the integrity constraints by receiving a checksum from a trusted platform module (TPM) and a virtual TPM for each of the plurality of hosts, decrypting the checksum, verifying the checksum by comparing the decrypted checksum against a checksum received from a digital signature associated with the guest application, and certifying results of the comparison of the decrypted checksum against a checksum received from the digital signature associated with the guest application by signing the results with a private key;
     determine for which of the plurality of hosts the integrity constraints and the geo-fencing constraints are satisfied;
     deploy the guest application on at least one of the plurality of hosts that satisfy the integrity constraints and the geo-fencing constraints, the guest application being specified as a workload pattern of virtual machines and interconnections between them;
     perform monitoring of a deployed workload pattern at execution time to mitigate against integrity modifications;
     detect an integrity violation of the deployed workload pattern; and
     responsive to detecting the integrity violation, initiate a corrective action, the corrective action comprising destroying the deployed workload pattern on the at least one of the plurality of hosts to which the workload pattern was deployed and redeploying the workload pattern to another of the plurality of hosts that satisfy the integrity constraints and the geo-fencing constraints.

9. The system of claim 8, wherein the processor is further configured to:
   provide evidence of compliance with the integrity constraints and the geo-fencing constraints to an attestation service and policy enforcement service which attest the compliance of at least one of the plurality of hosts on which the guest application was deployed in the cloud environment.

10. The system of claim 8, wherein the processor is further configured to:
   prevent initial deployment of the guest application when at least one of the integrity constraints and the geo-fencing constraints are not satisfied; and
   sending a notification that the at least one of the integrity constraints and the geo-fencing constraints are not satisfied.

11. The system of claim 8, wherein the processor is further configured to:
   specify the guest application as a workload pattern of Linux containers and interconnections between the Linux containers.

12. The system of claim 8, wherein the integrity constraints and the geo-fencing constraints are combined with a plurality of deployment constraints on the deployment of the workload pattern in a hybrid cloud environment.

* * * * *